United States Patent

[11] 3,622,991

[72] Inventors Stanley Lehrer
 Pompton Lakes;
 Raymond A. Robertson, Dover; John C. Holme, Wayne, all of N.J.
[21] Appl. No. 858,470
[22] Filed Sept. 16, 1969
[45] Patented Nov. 23, 1971
[73] Assignee Electro-Optics Devices Corporation
 Butler, N.J.

[54] ELECTRONIC LOCKING SYSTEM
 25 Claims, 19 Drawing Figs.
[52] U.S. Cl. .................................................. 340/147 R,
 70/278, 317/134, 340/147 MD, 340/149
[51] Int. Cl. ...................................................... G06k 7/06,
 G06k 17/00, H04q 3/02
[50] Field of Search .......................................... 340/147,
 164, 149; 317/134; 70/277, 278; 235/61.12, 61.1

[56] References Cited
UNITED STATES PATENTS

| | | | |
|---|---|---|---|
| 2,914,746 | 11/1959 | James ........................... | 340/149 |
| 3,392,558 | 7/1968 | Hedin et al. .................. | 317/134 |
| 3,436,010 | 4/1969 | Spanjersberg ................ | 235/61.1 X |
| 3,508,202 | 4/1970 | Joel, Jr. ......................... | 340/147 |

Primary Examiner—Donald J. Yusko
Attorney—Lane, Aitken, Dunner & Ziems

ABSTRACT: A door lock is opened by a binary-coded key card when inserted in an opening adjacent the lock. The binary access code for the lock is electronically changed for each new registrant to a particular room in a hotel or motel. The lock system includes a central control station and a plurality of substations, each serving a plurality of door units. Means are provided at a central control station for randomly generating a new binary access code, transmitting the access code through logic circuitry to the lock, and for controlling a punch press which produces a new key card containing the newly generated access code. The door control unit includes a card reader and memory circuit means for storing the newly generated access code. The memory circuit means for storing the newly generated access code. The memory circuit means stores the newly generated access code in a room key shift register, and a pass key access code in a pass key shift register. A card inserted into the card reader at the door is photoelectrically scanned to determine both its access code and whether the card is a pass key card or a room key card. The access code on the card key is thereafter electronically compared with the access data stored in the appropriate shift register. When the access code on the key card matches the stored data, the door lock is opened. In a disclosed embodiment, the means for producing the new key card includes a punch press having a plurality of appropriately placed punches controlled by solenoids connected to the output from a random number generator. When the new code is generated, the solenoids are actuated and openings are punched at predetermined locations in the key card. The circuit means at the central control station include master clock means for controlling the random number generating means and the multiplexing means which provide the central control station output data in serial form. Means are also provided for counting the number of binary "one" states in the central control output data. If the number of binary one states is unacceptable, a new access code is generated, whereas if the number of states is acceptable, the program cycle is completed.

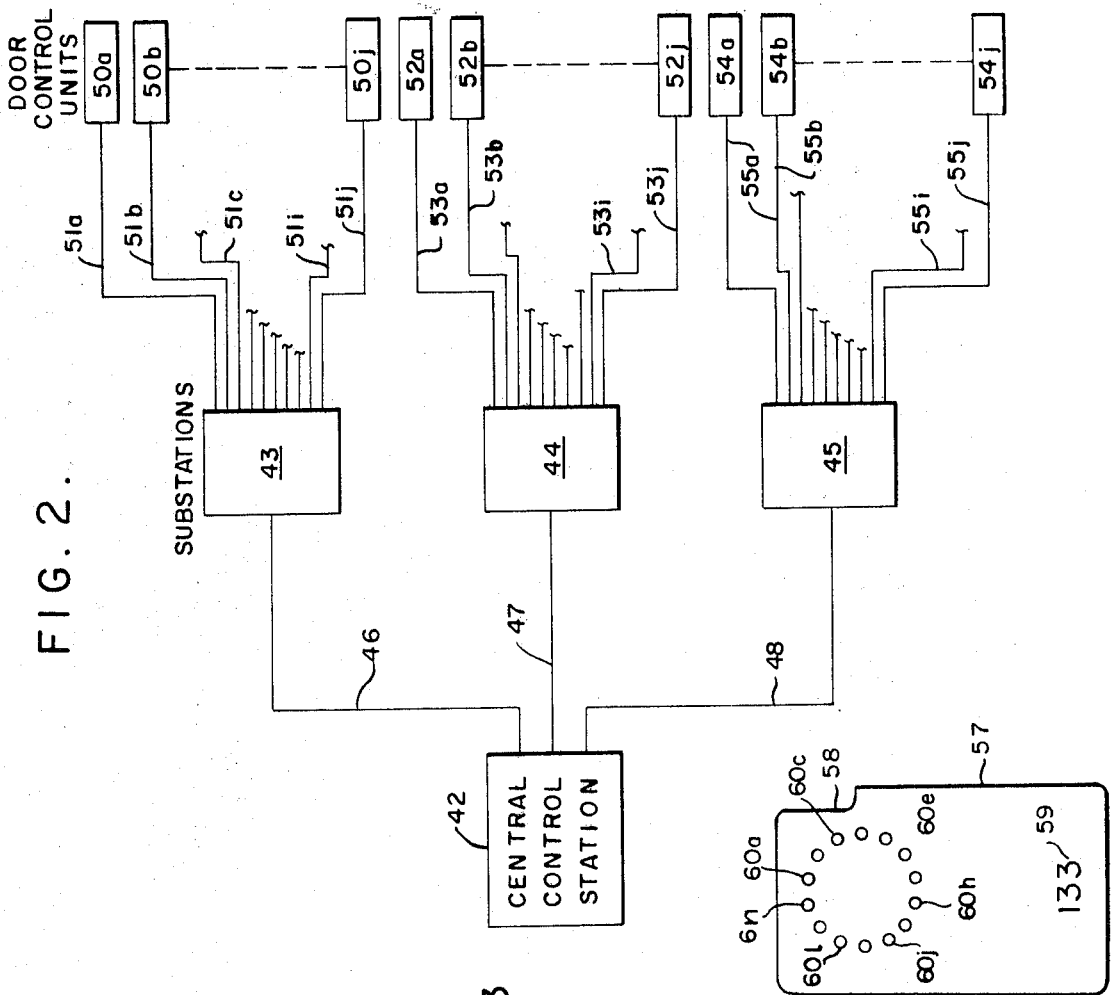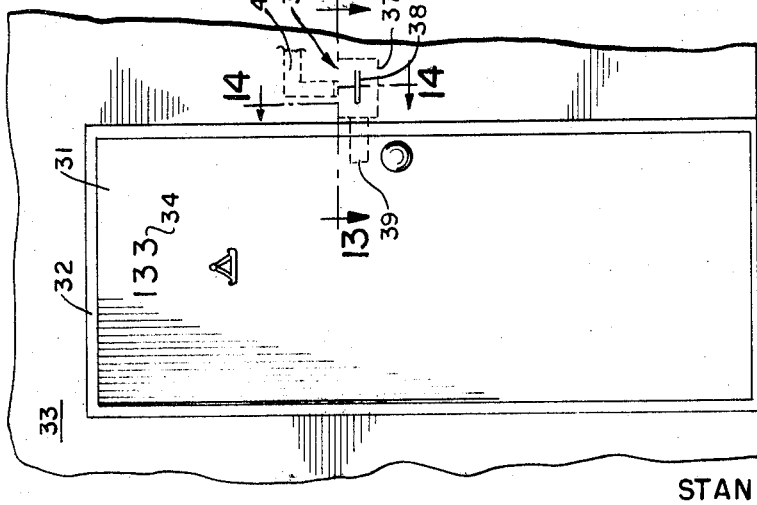

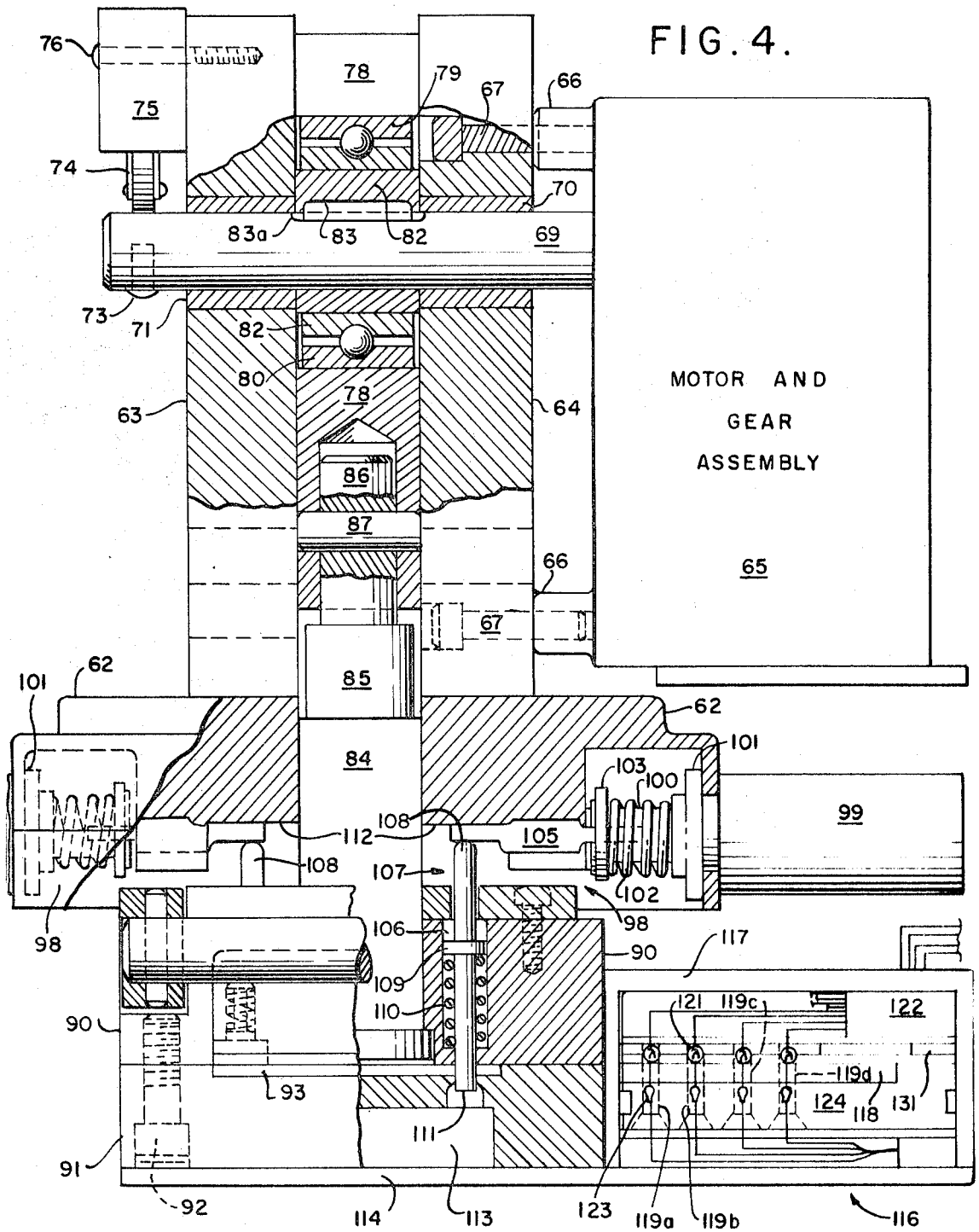

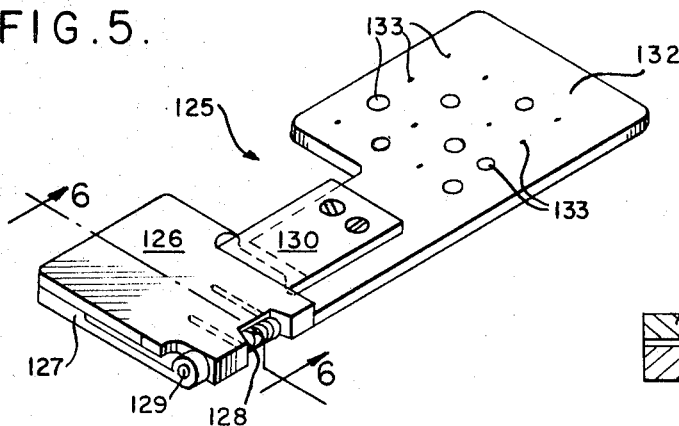
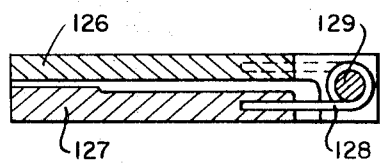
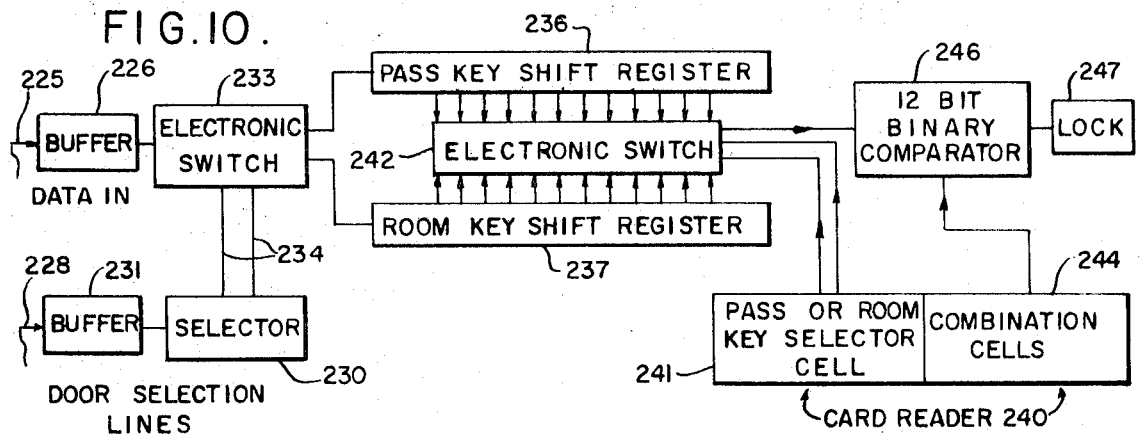
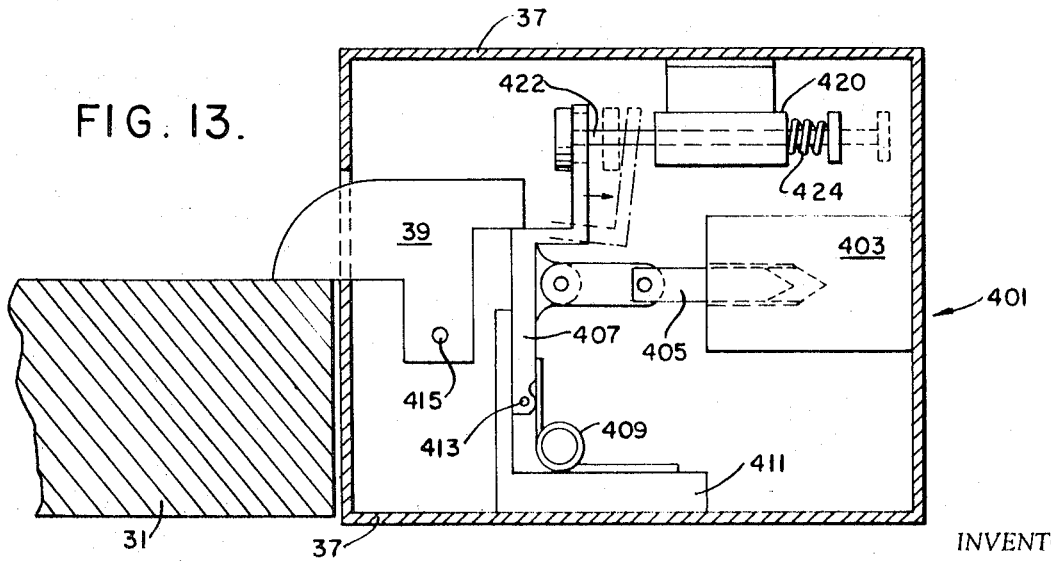

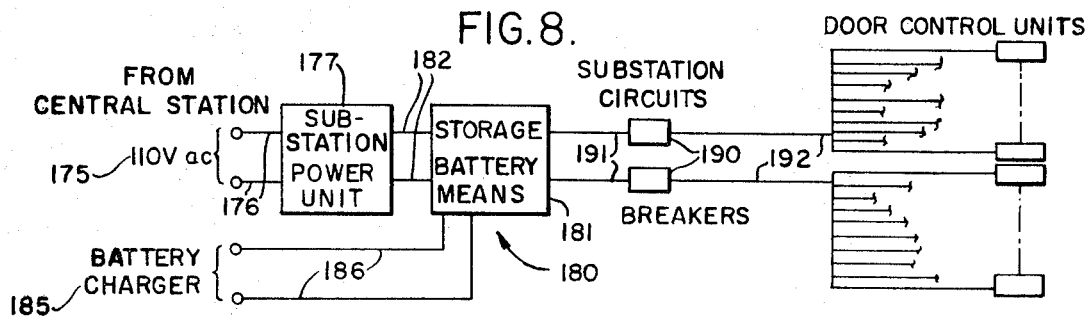
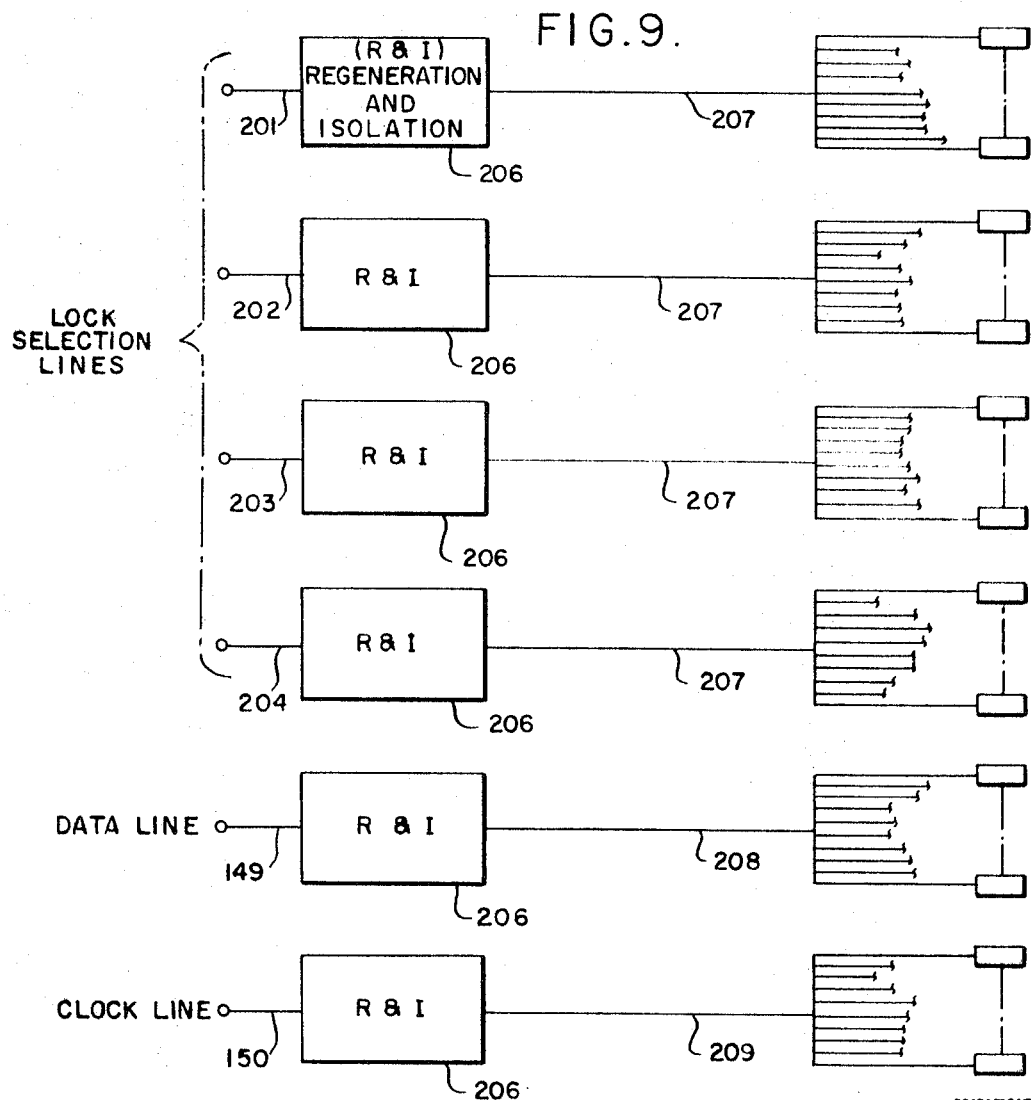

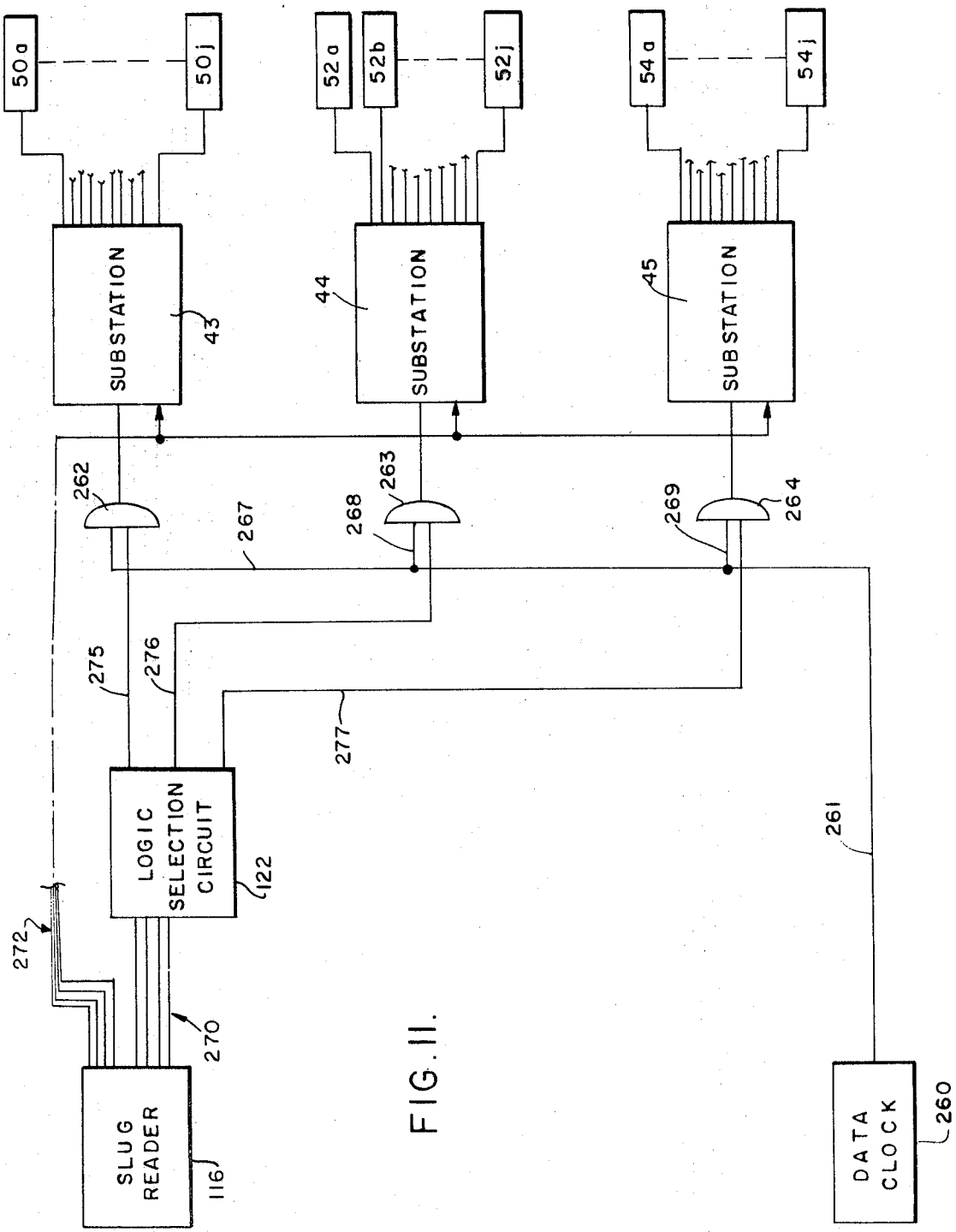
FIG. II.

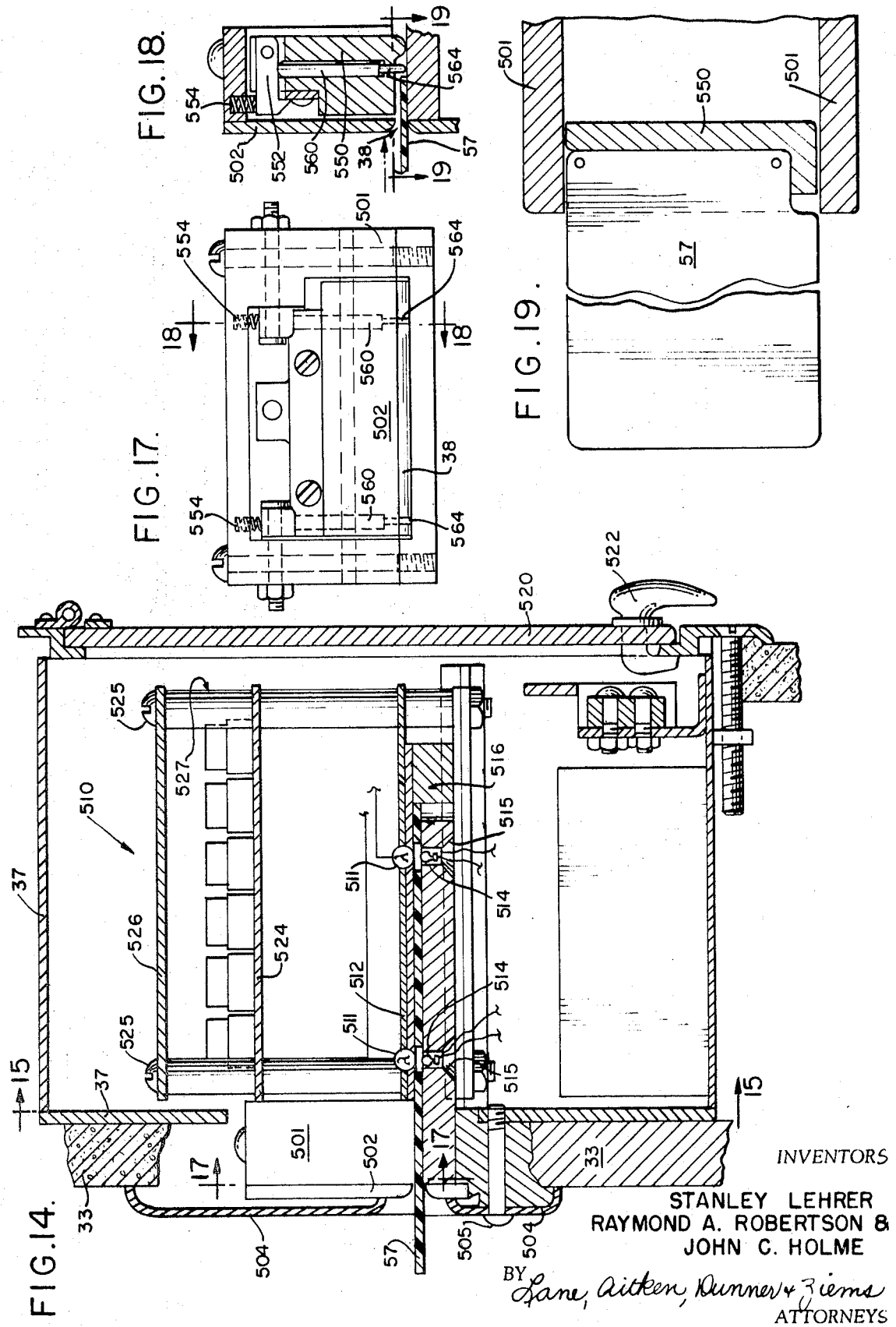

INVENTORS
STANLEY LEHRER
RAYMOND A. ROBERTSON &
JOHN C. HOLME
BY Lane, Aitken, Dunner & Ziems
ATTORNEYS

ELECTRONIC LOCKING SYSTEM

BACKGROUND OF THE INVENTION

This invention relates to an electronic locking system programmed to respond to a coded key card. More particularly, this invention relates to an electronic locking system which randomly generates an access code which is stored in a lock mechanism and which is coded into a key card for opening that lock mechanism.

It has long been a problem in the art to restrict access to a particular location to only authorized personnel. The problem is particularly acute in those situations where the authorized personnel are periodically changed, such as is caused by the turnover of guests in a hotel or motel. For example, a registrant may retain or duplicate the key to a room in order to return at a later date to gain access to the room when it is occupied by another.

Another source of unauthorized access to a given space is caused by a pass key which is issued to authorized service personnel, but which comes into the possession of unauthorized personnel who may take surreptitious advantage of the pass key. Accordingly, it is a problem in the art to provide a lock system which is intended to prevent unauthorized access to a secured location.

A solution to the problem is to change the lock at periodic intervals. However, such a solution is impracticable because of the high cost involved and because of the extensive record keeping which is required.

Another potential solution is to provide locks having a resetting capability which avoids the need for removing the lock. Examples of prior art which incorporate that solution include U.S. Pat. Nos. 3,450,953; 3,441,908; and 3,380,024.

The prior art also includes a number of systems which utilize coded elements to release the lock. Thus, electronic permutation locks are known which may utilize, by way of example, frequency responsive circuits. Such circuits, however, have lacked flexibility with respect to encoding and decoding of the lock. Where such circuits had required the tenant or authorized individual to recall the access code, for example, a number of digits in seriatim, a substantial risk was encountered that the access code would be forgotten. Moreover, in general, such circuits have not lent themselves to frequent, yet convenient, changes in the access code to the lock.

Accordingly, it is an object of this invention to provide a selective electronic locking system capable of effectively discriminating against unauthorized personnel.

It is a further object of this invention to provide a locking system which may be operated by a coded key card.

It is a further object of this invention to provide an electronic locking system in which the electronic code may be changed at frequent intervals, such as with each new tenant.

It is another object of this invention to provide an electronic lock system in which the access code is randomly generated and transmitted to the lock.

It is a further object of this invention to provide an electronic lock system which changes the access code to a lock and provides a coded key card which contains the newly generated access code.

It is a further object of this invention to provide an electronic lock system having a large number of programmable codes in which the key card is difficult to duplicate.

It is still another object of this invention to provide an electronic locking system which includes means for providing a key card containing a newly generated access code.

It is another object of this invention to provide a lock unit having means for storing a binary access code which controls the opening of the lock by either a coded pass key card or a coded room key card.

It is a still further object of this invention to provide an electronic lock which includes a card reader for comparing data encoded on a key card with data stored in a memory circuit in the unit.

It is a further object of this invention to provide a punch press for producing a binary key card wherein the press is controlled by a randomly generated access code circuit.

It is a further object of this invention to provide a lock system having means for generating a random access code, means controlled by the generating means for producing a key card containing the random access code, and lock means capable of receiving the random access code.

These and other objects of the invention will become apparent from a review of the following description and a review of the accompanying drawings.

SUMMARY OF THE INVENTION

An electronic lock system which overcomes the problems of the prior art and achieves the above-stated objects includes a lock which is released by the insertion of a properly coded key card. The key card is scanned photoelectrically so that when the card code and the electronically retained code at the lock coincide, the lock is released. It is a feature of this invention that for each new tenant, a new key card is encoded and the lock setting encoded in response to the generation of a random binary number so that key cards previously used to gain access to the room will no longer operate the lock. The system includes a central control means for providing clock and access data to each of a plurality of substations, each of which provides the signals for controlling a predetermined number of door control units.

The central control means, preferably located at the registration desk, includes means for resetting the door control in response to a newly generated code, and means for preparing an encoded key card also responsive to the newly generated code. The means for resetting the door control include electronic logic circuit means for randomly generating a new access code and master clock means for controlling the random number generating means and the electronic logic circuitry at the door unit.

The means for preparing the key card include a punch press having a plurality of solenoids connected to the random number generating circuit for preparing a key card having a plurality of openings which correspond to the newly generated code. Means are also provided for embossing the key card with the room number at the time the key card is encoded.

Circuit means are also provided for counting the number of logical "1" states in the encoding output data. If the number of high states is unsatisfactory, a new access code is generated.

The code which was generated in the electronic circuitry is also transmitted to the appropriate substation and thus to the door control memory by appropriate logic selection circuits.

Card reader means are provided at the door unit for protoelectrically scanning the key card. Memory means at the door unit include a pass key shift register for storing a pass access code, and a room key shift register for storing a room access code. The card reader means includes means for determining whether the key card is a pass key card or a room key card. Comparator means compare the access code on the key card with the access data stored in either the pass key shift register or the room key register depending on whether the key card is a pass key or a room key.

Means are provided for releasing the lock when the access code on the key card and the stored access code are identical. Thus, the lock may be opened in response to an encoded key card.

BRIEF DESCRIPTION OF THE DRAWINGS

In the drawings:

FIG. 1 illustrates the card reader mechanism in phantom outline in conjunction with a lock securing a door;

FIG. 2 is a block diagram of the electronic lock system according to the invention;

FIG. 3 shows a coded key card illustrating the positioning of potential openings in a circular array;

FIG. 4 is a diagram partially in section of the punch means for producing the key card in response to the output from the random number generating means;

FIG. 5 is a perspective view of a master slug for use with the punch means of FIG. 4;

FIG. 6 is a cross-sectional view taken along line 6—6 of FIG. 5;

FIG. 8 is a block diagram of a substation unit illustrating its basic components and including a battery power capability;

FIG. 9 is a block diagram of the substation unit showing the clock and data inputs from the circuit of FIG. 7 and the door selection inputs from the master slug reader in FIG. 4;

FIG. 10 is a block diagram of the circuit components at the door lock;

FIG. 11 is a block diagram of the substation selection logic circuit;

FIG. 13 is a mechanical schematic view, partially in section, showing a representative means for releasing the door lock which also includes an emergency release upon a loss of power;

FIG. 14 is a vertical sectional side view of the card reader structure located in the door unit;

FIG. 17 is a front elevational sectional view of the card reader slot structure taken along line 17—17 of FIG. 14;

FIG. 18 is a sectional view of the card reader slot structure taken along line 18—18 of FIG. 17; and, FIG. 19 is a horizontal cross-sectional view of the card reader slot structure taken along line 19—19 of FIG. 18.

DETAILED DESCRIPTION OF THE PREFERRED EMBODIMENTS

Figure 7:
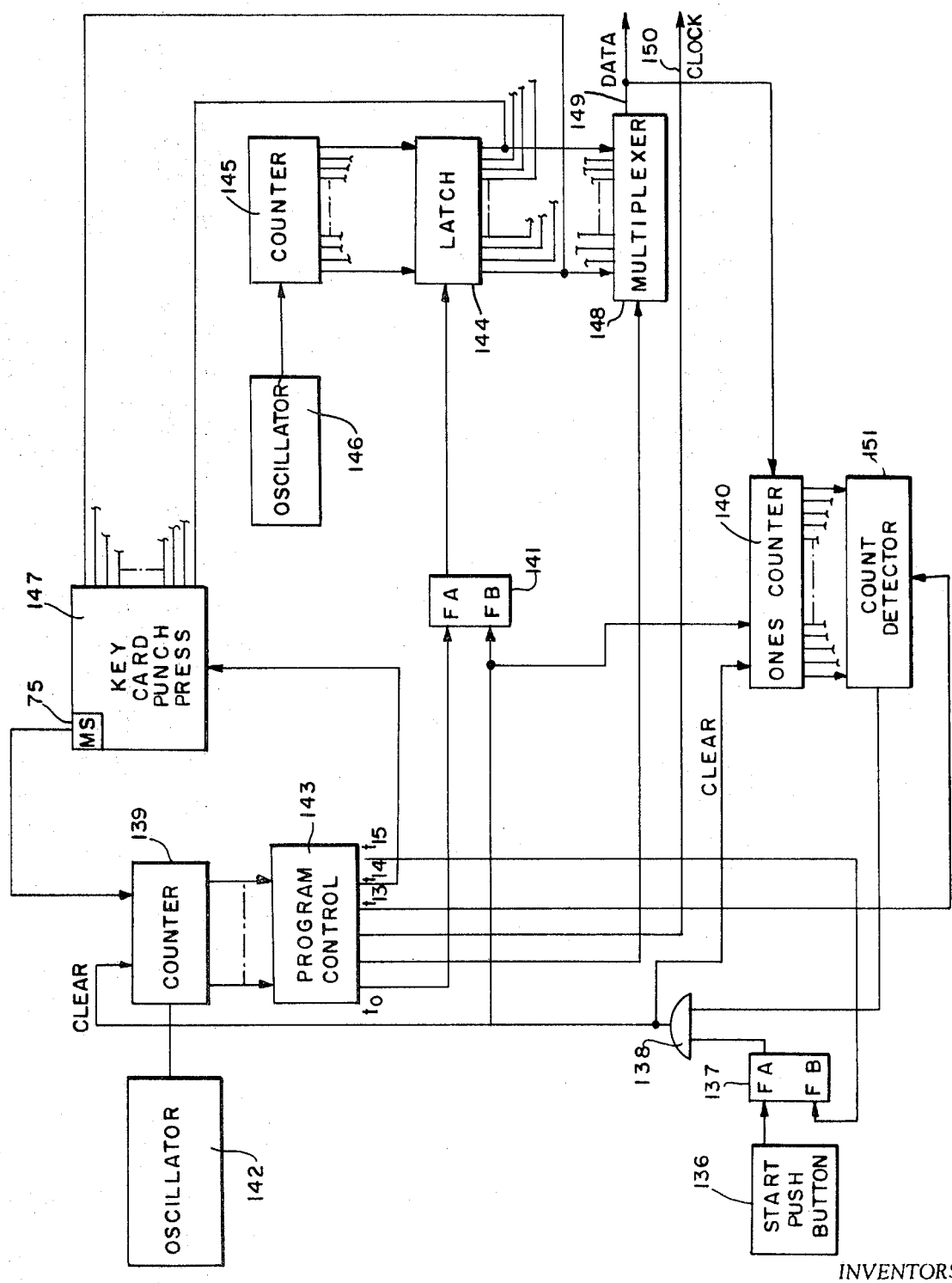
FIG. 7 is a block diagram of the electronic circuitry at the central control station for actuating the punch solenoids and for providing the data and clock outputs to the transmission lines to the lock units.

In FIG. 1, an access door 31 to a hotel or motel room is located in a suitable frame 32 in the wall 33 of the building structure. Such rooms are generally designated with an identifying number, such as that designated by reference numeral 34.

A door unit 36 for releasing the lock upon command is mounted in the wall 33 adjacent to the door 31. The door unit 36 comprises a housing 37, shown in phantom outline and recessed in the wall, and a card reader slot 38. The card slot 38 is the only portion of the door unit 36 visible to the tenant. The door unit 36 further includes a locking member, such as a striker bar or retractable member, shown in phantom outline by reference numeral 39. The electrical leads to unit 36 are shown in phantom outline at 40 and may include a multilead cable to provide the electronic data and power supply to the door unit 36.

In operation, the locking member 39 is released by the insertion of a plastic card, or key, containing a proper access code into the card reader slot 38. The card key is scanned photoelectrically by photocells located in the door unit 36. When the card access code and the electronic lock setting coincide, the door 31 may be opened.

FIG. 2 shows, in block diagrams, the basic components of the lock system according to the invention. The central control station 42 includes means for randomly generating a binary access code for the respective door units and means for preparing a key card that will release the lock of the designated room in accordance with the newly generated binary access code. The output from the station 42 is provided by leads 46, 47 and 48 to substations 43, 44 and 45 respectively. The central control station also includes appropriate lock selection logic circuit means for selecting an appropriate substation. For example, if the room for which a new access code is generated, and for which a new key card is prepared, is serviced by substation 44, selection logic circuit means are provided to inhibit the transmission of the new access data to substations 43 and 45 on leads 46 and 48 respectively. Such logic circuit means for achieving the initial lock selection is well known in the art, and especially in the computer art.

In the alternative, the newly generated data could be transferred on more than one of the representative transmission lines 46, 47 and 48 for selection by appropriate logic circuit means located at the substation. Thus, each substation 43-45 may be designed to include logic circuit means for accepting the randomly generated access code intended for one of its door units, while rejecting the access code intended for a door unit serviced by another substation.

The substation arrangement has been found advantageous to provide service to a local group of rooms, and to locate the primary and emergency power supplies. Thus, the outputs from substation 43 are provided to a group of door control units 50a through 50j by way of transmission lines 51a through 51j respectively. Similarly, the outputs from substation 44 are provided to the door control units 52a through 52j by way of lines 53a through 53j, and the outputs from substation 45 are provided to door control units 54a through 54j by way of lines 55a through 55j.

The substations are capable of transmitting the selected lock selection binary signals, the access data signals, and the clock signals to the door units for selection by logic circuit means as will be discussed. Each of the substations includes, in a preferred embodiment, electronic circuit means for eliminating spurious noise signals and for electronically isolating the substation to prevent the injection of electrical signals from the door units which will permit access to one or more of the rooms serviced by a given substation.

The central control station 42 may be located at the hotel registration desk to be operated by the registration clerk whenever a new key is issued. The unit, which may be built into a control console and may include card verifier means, operates to reset the combination code stored in a memory unit in a designated door control unit and also to prepare a new key that will operate that door control unit. Thus, a tenant arriving at the motel may be assigned a room having a lock controlled by door control unit 52b. At the time of his registration, a new card is processed at the control station 42 at the same time that the binary access code at the door control unit 52b is reset.

The central control station is also capable of processing a pass key card and generating data which will permit a single key card to open a plurality of door units. In a preferred embodiment, both pass key access data and room key access data are stored in memory circuit means at the door unit.

Substations 43-45 provide intermediate stations between the central control station 42 and the individual door control units. Inclusion of substations in the system also minimizes the amount of cabling from the central control station 42 to convey the coded information for resetting the door controls. Moreover, permanent and emergency power supplies and circuit protection devices, as will be discussed, may also be provided at the substations.

In FIG. 3, a typical card key is designated at 57 and includes means, such as a notch 58, to prevent improper insertion of the card into the slot at the door. Each card is embossed with the room identification designation 59 and may also include additional information such as the name and location of the hotel or motel.

A plurality of positions 60a through 60n are shown on card 57, at which positions, for example, openings may be provided in the card according to a predetermined code. In a binary system, an opening may constitute a logical "1" state, while the absence of an opening at a possible opening location may constitute a logical "0" state, or vice versa. FIG. 3 shows only the possible openings since it is not desirable to provide a card having all openings or no openings. Such cards are readily duplicated so that unauthorized access to the room is possible.

In a preferred embodiment, the openings are arranged in a circular array in order to complicate attempts to open the lock with an unauthorized card key having manual shutters. Moreover, the problem of designing an unauthorized card key for clandestine purposes may be further complicated by setting the arrangement so that only combinations containing, for example, at least four but no more that 10 openings in the card will open the lock.

A card key 57 is prepared for each new tenant to a particular room and includes a combination code of openings and absence of openings which is responsive to the binary access code which was transmitted to the door control unit. Thus, an appropriate card key 47 may include openings at positions 60b, 60d, 60g and 60h, while the remaining opening locations have no opening therein.

Means are shown in FIG. 4, which are located at the central control station, for processing a blank card key to contain the newly generated binary code.

A main support member 62 includes a first side member 63 and a second side member 64. The power to the unit is provided by a gear and motor assembly 65 secured to side member 64 by a plurality of securing members 67, threaddly engaged with protruding members 66 which are secured to the gear and motor assembly 65. A drive shaft 69 is journaled in the side members 63 and 64 to rotate freely in conjunction with the bearings 70 and 71 respectively.

An eccentric member 73 is secured to the shaft 69 for contacting the projecting member 74 on a microswitch 75 attached by a bolt 76 to the side plate 63. The output from the microswitch is used to advise the electronic circuitry that a complete revolution of the drive shaft 69 has been completed, so that the punch press is at a ready position to receive additional electronic information and to process another blank key card.

The ram member 78 is disposed for vertical movement between side members 63 and 64. The reciprocatory action of ram member 78 is achieved by a coaction of an eccentric member 82 provided with bearings 79 and 80 contained within a rectangular cavity located in the ram member 78. The eccentric member 82 is secured to the shaft 69 by a spline arrangement 83 coacting with a slot 83a in shaft 69. A draw rod 84 includes a transition section 85 connected to a securing tip 86 which is attached to the ram member 78 by a dowel pin 87 for transmitting the vertical, one-cycle, reciprocating motion of the ram member to a punch block 90 and a die block 91 secured thereto, for example, by bolt 92.

The punch block 90 and the die block 91 are arranged to provide a card receiving slot 93 which permits the entry of a blank card onto which the binary access code is to be punched by action of the punch press.

The main support member 62 defines a plurality of cavities 98 disposed in a circular array about its periphery for receiving a plurality of solenoids 99. The number of solenoids corresponds to the number of openings to be provided in the circular array in the card key, as discussed in connection with FIG. 3.

The solenoid 99 is shown in its unenergized state and is secured to housing 62 by locknut 101. A return spring 102 is provided about protruding retracting armature 100 adjacent a washer 103. A punch backup rod 105 is secured to retractable armature 100 of solenoid 99. Each of the solenoids included in the array about the periphery of housing 62 is similarly constructed.

A typical punch assembly is designated generally at 107 and includes a tail member 108, a flange plate 109 in contact with a punch return spring 110, and a cutting tip 111 located to punch an opening in a blank card located in slot 93 when the punch backup rod is in its normal state.

When the solenoid 99 is unenergized, the punch backup rod 105 remains extended as shown in FIG. 4. As the ram member 78 is raised by the action of the eccentric member 82 rotating in conjunction with the shaft 69, the punch block 90 and the die block 91 are raised, thus raising the upper end of the member 108 of the punch assembly until it contacts the punch backup rod 105. As the ram member further rises, the punch head 108 remains fixed against the punch backup rod 105, causing the cutting tip 111 to protrude through the card located in slot 93.

On the other hand, when solenoid 99 is energized, the punch backup rod is retracted from is normal position by the action of the solenoid drawing armature 100 into the solenoid. In that instance, the tip of member 108 is free to travel to the surface 112 on head member 62. By sizing the components of the punch press to operate with, for example, a 3/16-inch stroke, openings will be punched in a card in slot 93 at those locations at which the solenoid 99 remains unenergized, but no openings will appear at those locations in which the solenoid is energized. Thus, electronic circuitry which provides outputs which energize predetermined solenoids 99 located about the periphery of housing member 62 will control the presence or absence of openings in the card key. Accordingly, electrical binary signals may be readily converted to a mechanical structure.

If desired, the extended position of the retractable member 105 could be obtained by energizing solenoid 99. Thus, in this alternative, an energizing pulse supplied to a solenoid would cause an opening in a corresponding location in the key card, while the absence of an energizing pulse would leave the key card unperforated. In either event, the logic circuitry which drives the solenoids will be selected to maintain a logical correlation between the data encoded in the key by the perforations therein and the data stored at the door unit.

A punch collection cavity is shown at 113 for collecting the punched blanks from the card key and a baseplate 114 is secured to the base of the member to provide an adequate enclosure.

A master slug is provided at the control location for embossing the card key with the proper room number and for providing lock selection data to the door control units. A plurality of master slugs may be stored at the control area for selection by the room clerk when a tenant registers. Each master slug contains a binary matrix which will serve to identify a particular lock as will be further discussed.

A master slug 125, shown in FIG. 5, includes a male die plate 126 and a female die plate 127, which is spring loaded by spring 128 secured to pin 129. Thus, the die plate 126 is hinged to permit insertion of the blank card between plate 126 and plate 127. The die plates 126 and 127 contain the room number in regular Arabic numerals and are used to emboss the room number onto the key card during the punching process. The slug 125 includes a stop plate 130 for limiting the opening of the plates and a plurality of opening locations designated at 133 in plate 132. Thus, the openings or blanks in the plate 132 contain binary-coded information for the room number in a manner which may be electronically read by the master slug reader means 116 secured to the punch press shown in FIG. 4.

The number and location of openings 133 in plate 132 are binary coded so that the door unit which is to be changed may be electronically selected. By way of example, an array of four openings in a column and having four columns will permit the selection of up to 10 substations, if the situations of all openings or all blanks are eliminated from consideration. Thus, openings in the second and fourth positions in a first column corresponding to a binary code of 0101 would indicate that the room is serviced by the fifth substation, while the binary data in one or more of the adjacent columns may serve to indicate the particular room. In addition, a binary digit may be selected to indicate whether the card is to be a pass key card or a room key card. The details of binary coding are well known in the art.

The master slug reader 116 includes a reader housing 117 and a slot 118 for receiving the code plate 132 of the master slug 125. A plurality of openings, representatively shown by reference numerals 119a through 119d, are provided in the master reader 117 and correspond in number and location to the potential openings 133 in the master slug 125. In a preferred embodiment, phototransistors designated generally at 121 are disposed in a printed circuit board 131 on one side of the slot 118 in register with the openings 119, while an array of light bulbs, designated generally at 123, are disposed on the other side of slot 118 in a printed circuit board 124 and are also in register with openings 119. In this manner, the master slug is read by the number of open or blank spaces in each column of the array as determined by the illumination or lack of illumination on the phototransistor. The circuit details for such an array of phototransistors are also well known in the art.

The binary-coded from the phototransistors 121 provides the input to the circuit means, designated generally at 122. The circuit means 122 includes logic circuitry which is required to generate signals to enable gating circuitry to route the data and clock signals produced on channels 149 and 150 (shown in FIG. 7) to the selected door corresponding to the code on the master slug 125 and read out by reader 116. The electronic circuitry at the central station, shown in block form in FIG. 7, performs the function of generating a random binary number, transmitting signals representing this number to the selected door lock, and controlling the punch press to punch a key card blank in accordance with this binary number. These functions are initiated in response to the actuation of a push button 136. When the pushbutton is actuated, it sets a flip-flop 137 in its A state. In response to being set in its A state, the flip-flop 137 applies a signal through an OR-gate 138 to binary counters 139 and 140 to clear these counters or in other words to set each of these counters to register counts of zero. The signal produced by the flip-flop 137 and passing through the OR-gate 138 is also applied to a flip-flop 141 to set the flip-flop 141 in its B state.

The counter 139 counts pulses produced by an oscillator 142 and continuously applies signals representing the states of each of the stages thereof to a program control circuit 143, which in response to the signals received from the counter 139 controls the sequence of operation at the central station. In response to the signals received from the binary counter 139 the program control circuit 143 divides the time up into 16 divisions which shall be referred to as $t_0$ through $t_{15}$. At time $t_0$, the program control 143 applies a signal to the flip-flop 141 to switch the flip-flop 141 to its A state. When in its A state, the flip-flop 141 will continuously apply an inhibiting signal to latch circuit 144.

The latch circuit 144 comprises a register for storing 12 digit binary numbers represented by signals applied thereto by a binary counter 145. The binary counter 145 is a 12 stage binary counter and continuously counts pulses applied thereto by an oscillator 146. When the count in the counter 145 reaches the maximum binary count registrable by the counter, the counter 145 recycles to zero and begins counting again. Binary signals representing the count registered by the counter 145 are applied in parallel to the latch 144 and the latch 144, unless inhibited by a signal from flip-flop 141, stores the binary number represented by these applied signals. Thus, unless the latch 144 is inhibited, the binary number registered in the latch 144 will follow precisely the count registered in the counter 145.

However, when the flip-flop 141 switches to its A state, it locks the count presently stored in the latch 144 and prevents the latch from changing the count registered thereby as the count registered by the counter 145 continues incrementing. Thus, at time $t_0$, the flip-flop 141 is switched to its A state and a random 12 digit binary number is registered in the latch 144. Signals representing the binary number stored in the latch 144 are applied to the key card punch press which is described above with respect to FIG. 4 and which is designated by the reference number 147 in FIG. 7.

Signals representing the binary number stored in the latch 144 are also applied in parallel to a multiplexer 148, which also receives signals from the program control 143 during times $t_1$ through $t_{12}$. In response to the signals from the program control 143, the multiplexer 148 reads out the 12 digits of the binary number stored in the latch 144 in sequence and transmits them over data channel 149 to the selected door lock to be registered in a shift register therein, each digit being transmitted during a different one of the time periods $t_1$ through $t_{12}$. Along with the data signals on channel 149, the program control 143 sends clock pulses on channel 150, one clock pulse being sent with each binary digit. Thus, from time $t_1$ to time $t_{12}$, the 12 binary digits stored in the latch 144 are transmitted in sequence to the selected door lock over channel 149.

The binary signals on channel 149 are applied to the ones counter 140 which counts each output on channel 149 representing a binary one. Thus, after the latch 144 has been read out by the multiplexer 148, the ones counter 140 will contain a count representing the number of binary ones in the binary number stored in latch 144.

Signals representing the count stored in the ones counter 140 are applied to a count detector 151. At time $t_{13}$ after the number stored in the latch 144 has been read out in sequence by the multiplexer 148 and the ones in the binary number counted by the binary counter 140, program control 143 will enable the count detector 151.

The count detector 151 upon being enabled determines whether or not the count registered by the ones counter 140 is at least four and is no greater than 10. If the count registered by the counter 140 upon $t_{13}$ is less than four or greater than 10, the number of ones in the binary number in the latch 144 is not acceptable and count detector 151 will produce an output signal which is applied through the OR-gate 138 to clear the counter 139 as well as the ones counter 140 and also to set the flip-flop 141 back in its B state. As a result the latch 144 will again store the count registered by the counter 145, the program control 143 will start again through the sequence from time $t_0$, and the cycle will be repeated with a new binary number being locked into the latch 144 at time $t_0$. In this manner, the binary number which is to be represented by the code punched in the blank key card and stored in the corresponding door lock is made to contain at least four binary ones and no more than 10 binary ones.

If at time $t_{13}$, the ones counter 140 registers a count of at least four and no greater than 10, meaning that the binary number in latch 144 contains at least four binary ones and no more than 10 binary ones, then the count detector 151 will not produce an output signal at time $t_{13}$. Accordingly, the count registered by the counter 139 will continue to increase and as a result the program control 143 will proceed to time $t_{14}$. At time $t_{14}$, the program control 143 will apply an enabling signal to the key card punch press 147 and cause it to punch the blank key card contained in the press in accordance with the binary signals applied to the press from the latch 144 and representing the binary number stored in the latch 144. For each binary one, the key card punch press 147 will punch a hole in the blank key card and will leave a position blank in the key card for each binary zero applied. Because of the function performed by ones counter 140, each blank key card will have at least four holes punched therein and no more than 10 holes punched therein.

While the key card punch press 147 is performing the function of punching a card, it closes a microswitch 75 as described with reference to FIG. 4. The closure of the microswitch 75 causes a disabling signal to be applied to the counter 139 preventing the count in the counter 139 from increasing further. In this manner, the program control 143 is prevented from proceeding to time $t_{15}$ until after the key card punch press 147 has completed the punching operation on the key card blank. When the key card punch press has completed its cycle, the microswitch 175 opens and the counting by the counter 139 is permitted to proceed. Accordingly, the program control 143 will proceed to time $t_{15}$ at which time it will apply a signal to reset the flip-flop 137 back to its B state. At this time, the system will then be ready to receive another blank key card to be punched with a randomly generated binary number.

It will be noted that when the binary number locked in the latch 144 contains an unacceptable number of ones, this binary number is transmitted and stored in the shift register of the selected door lock. However, the recycling of the circuitry in response to the output signal of the count detector 151 at time $t_{13}$ causes a new binary number to be transmitted to the selected lock to replace the one previously stored therein containing an unacceptable number of binary ones.

FIG. 8 is a block diagram of a portion of a substation showing the power supply for all of the locks served by the substation. Each substation includes a source 175 of alternating current input voltage provided to the substation on the power lines 176 connected to the central control station. The substation power unit 177 includes a transformer circuit, a rectifier circuit and an appropriate filter to convert the input voltage to a source of direct current which is provided to each of the door control units served by the substation.

An emergency power supply designated generally at 180 includes storage battery means 181. The storage battery means 181 provides a source of direct current voltage to the door control units in the event of power failure and include a pair of batteries, for example, vented nickel-cadmium batteries, to provide both positive and negative supplies to the door control units. The batteries are permanently connected in circuit with the substation power unit 177 through reverse-biased blocking diodes to prevent battery damage by charging caused by the output voltage from the unit 177 on lines 182.

The central control station includes a battery charger 185 having an output which is provided to the batteries on lines 186. Accordingly, the batteries may be periodically charged upon command from the central control station.

A plurality of circuit breakers 190 are in circuit with the output of the substation power unit 177 and the storage battery means 180 through lines 191, and with each of the door control units serviced by that substation by leads 192. The circuit breakers 190 are arranged to permit operation of the remaining door units if a set of lines becomes short circuited. Preferably, the circuit breakers are self-resetting after the short circuit condition ceases.

FIG. 9 is a block diagram of the circuit components which are in circuit with the data channel 149 and the clock channel 150 and each of the lock selections lines 201–204, which are provided to the substation from the logic selection circuit 122 at the central control station. Regeneration and isolation circuits 206 are connected to each of the above-mentioned lines at each substation.

The regeneration circuits reduce the spurious noise which may be carried on the incoming signals to the substation. Preferably, each regeneration circuit 206 includes a filter circuit and a clipping circuit to reduce the amplitude of the input pulse to reduce the noise in the pulse. Each regeneration circuit also includes circuit means for amplifying the pulse which is provided to the door unit on line 207.

Since each group of door control units is in parallel with line 207, isolation circuits are provided in each line to prevent tampering with the lock combinations by injecting a voltage in a reverse direction along any one set of leads.

As an illustrative example, the isolation circuit may include a transistor, having its base in circuit with the input line. By clamping its collector to a predetermined signal level, signals provided to the isolation circuit from the door control unit will not appear on the other door unit leads connected to the collector of the transistor.

Standby batteries may be provided at each door control unit. Accordingly, each substation may also include means for charging the standby batteries at predetermined intervals.

It will be understood that, for the embodiment illustrated, each substation receives 10 lines from the central control station, i.e. a pair of power lines 176, a pair of battery charging lines 186, four-door control selection lines 201–204, a data line 149, and a clock line 150. It will also be understood that, since each door control unit requires a like number of lines, the number of output lines from each substation is numerically equal to 10 times the number of door control units serviced by that substation.

FIG. 10 is a block diagram of the circuit components included for each door control unit 36 located in the room wall next to the appropriate door. The input designated at 225 provides the data and clock inputs which were provided on channels 149 and 150 respectively to each door unit through a buffer circuit 226. The input designated at 228 includes a plurality of leads containing the binary-coded information provided at the output of the master slug card reader 116 through the selection circuit 122. The room selection input is provided to a selector circuit 230 through a buffer circuit 231. Selector circuit 230 is preferably an AND-gate circuit which controls an electronic switch 233 to control the transmission of the data and clock signals by leads 234. Thus, while the data and clock signals are provided to all of the door control units, the selector circuit 230 controls their transmission to the proper door.

The electronic switch 233, preferably a NAND gate circuit, controls the transmission of the access code from data channel 149 and clock channel 150 into either the pass key register 236 or to the room key shift register 237, according to the logical commands previously contained in the clock data on channel 150. The access code stored in the pass key shift register 236 is different from the access code stored in the room key shift register 237 and is stored at a different time.

After an access code has been stored in the pass key shift register 236 and an access code has been stored in the room key shift register 237, the lock 247 may be opened by the insertion of a responsively coded key card into the slot of the card reader.

A card reader is designated generally at 240 and includes means for determining whether the key card is a pass key or a room key. For example, an opening in the circular array in the key card may be chosen to activate either a pass key selector cell or a room key selector cell 241 to control the selection of either the pass key shift register 236 or the room key shift register 237 by the electronic switch 242.

In the preferred embodiment, the card reader 240 contains an array of phototransistors in register with a plurality of light bulbs arranged in register with the possible openings in the key card, similar to the slug reader described in FIG. 4. When the pass key phototransistor is illuminated, the output from the card reader combination cells 244 is compared to the data stored in the pass key shift register 236. When the two sets of 12 bits are identical, as determined by the 12 bit binary comparator 246, the lock 247 is caused to open.

On the other hand, if the individual room key phototransistor in the selector cell 241 is selected, the access code on the key card will be compared to the access code store in the room key shift register 237. As previously discussed, if the respective access codes coincide, the lock 247 is caused to open.

It may be understood that one access code may be stored in the pass key shift register of a predetermined number of door control units, for example all of the door units serviced by a given substation, or all of the door units on a given floor. This will permit a coded card to open a number of doors for room servicing and the like.

FIG. 11 is a block diagram of a circuit for selecting a substation and transmitting the lock selection data from the slug reader 116 located at the central control station to the predetermined door control unit. The operation of the slug reader 116 and the logic selection circuit 122 were previously described in connection with FIG. 4, while block 260 represents the source of clock signals on clock channel 150 and the source of data signals on data channel 149, discussed in connection with FIG. 7. Thus, the clock signals and the data signals are provided on line 261 to each of the gates 262–264 on lines 267–269 respectively.

The binary-coded data for selecting the desired substation is provided from the slug reader 116 to the logic selection circuit 122 on lines 270 shown as a four-wire cable. Four substation-selecting leads 270 are shown and contain the substation selection data encoded on plate 132 of the master slug 125 shown in FIG. 5 and read out in the slug reader 116 by the phototransistor array described in connection with FIG. 4. Similarly, the four lock selection leads, designated generally at 272, contain the lock selection data encoded on plate 132 of the master slug 125 and read out by the slug reader 116.

The substation enabling data lines 275–277 are respectively connected from the output of the logic selection circuit to the inputs of the AND-gates 262–264. Each of the data lines 275–277 contains data, derived from the signals on leads 270, which will enable only the AND gate which permits transmission of the lock selection data to the proper substation. Thus, the data on lines 275–277 will enable only the proper AND gate.

For example, suppose that lock control unit 52b is to be changed to the randomly generated access code provided by the circuit of FIG. 7. The master slug for the room controlled by the lock unit 52b thus contains encoded data for selecting the lock unit 52b and encoded data for selecting substation 44 since substation 44 services lock control unit 52b. Accordingly, the slug reader 116 reads out the substation selection data from the master slug on lines 270 and the lock selection data on leads 272. The logic circuit 122 converts the substation selection data on leads 270 into data which will enable AND-gate 263 and disable AND-gates 262 and 264. When AND-gate 263 is enabled, the lock selection data on leads 272 is transmitted to substation 44 to be selected at lock 52b by the circuit of FIG. 10, as will be described in greater detail with respect to FIG. 12.

Figure 12:
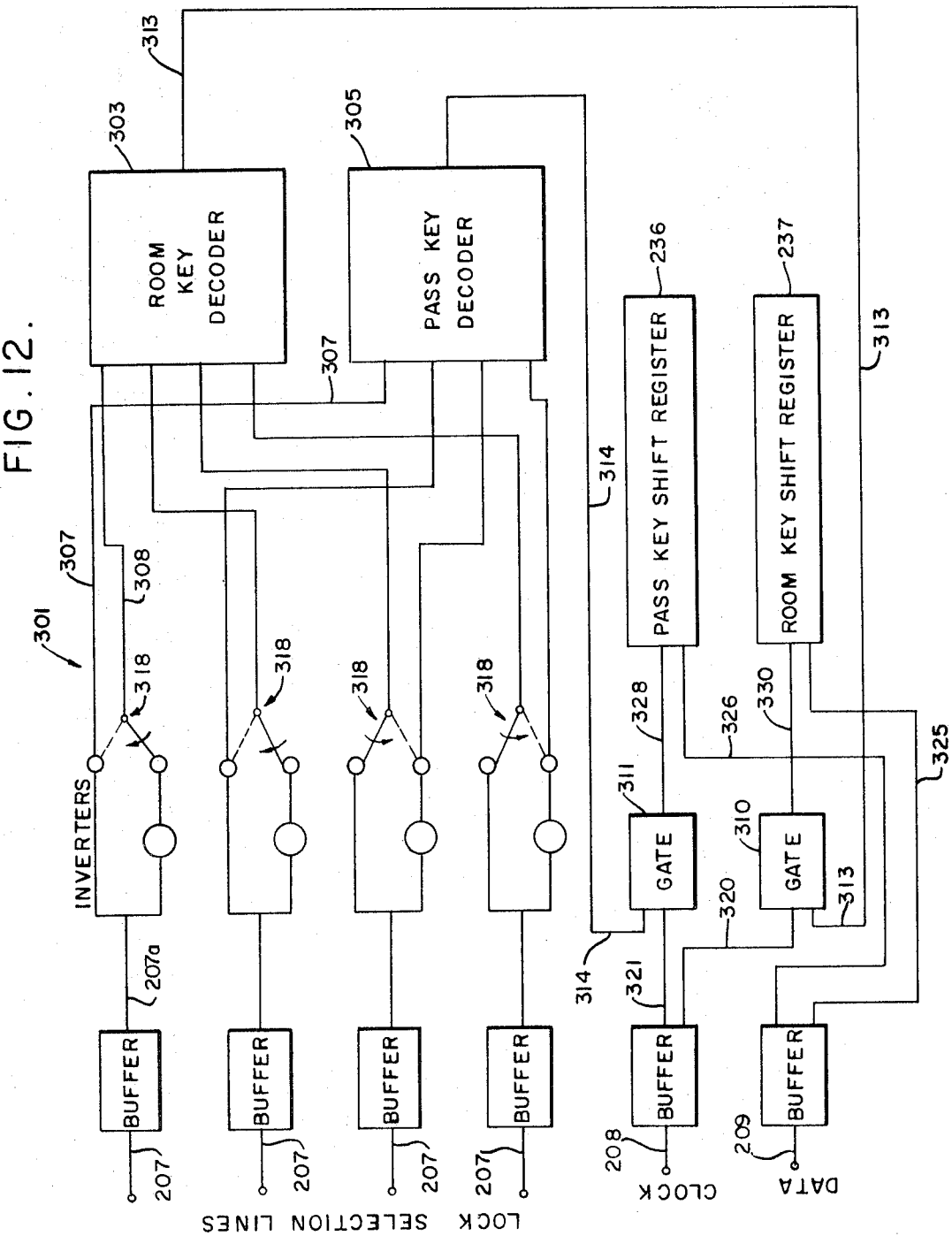
FIG. 12 is a block diagram of the circuit components for storing the access data in either a pass key or room key shift register wherein the lock selection inputs, the data input, and the clock input are taken from a selected substation, such as is representatively shown in FIGS. 8 and 9.

FIG. 12 is a block diagram of the circuit which is contained with each lock control unit for selecting the correct lock by decoding the data encoded on the lock selection lines 207. The data on the lock selection leads 207 has been obtained, continuing the previous example, from the card reader 116, leads 272, and substation 44. The lock selection data is provided from substation 44 to all of the locks 52a–52j serviced by substation 44, as described in connection with FIG. 9.

The data signals are provided from the data channel 149, shown in FIG. 7, through substation 44 to lock 52b on lead 208. Similarly, the clock signals are provided from the clock channel 150, shown in FIG. 7, through substation 44 to lock 52b. Both the clock signals and the data signals are provided to all of the locks 52a–52j serviced by substation 44, as described in connection with FIG. 9.

A logic circuit, designated generally at 301 receives the buffered lock selection data from the lock selection leads 207 and transmits the data to both a room key decoder 303 and a pass key decoder located at the lock unit. The lock selection data may be provided either directly or in an inverted form in order to select the proper lock. For example, lock selection data on lead 207a is applied directly to the pass key decoder 305 on line 307, and in an inverted form to the room key decoder 303 on line 308.

Inversion of certain of the lock selection data signals may be necessary to cause the room key decoder 303 or the pass key decoder 305 to operate to enable gate 310 or gate 311 by an output signal on lines 313 and 314 respectively. Each of the decoders 303 and 305 includes a four-input NAND gate which requires that all of the inputs receive a binary one signal for an enabling output to appear on either of leads 313 or 314. For example, the binary code for room 3 of a set is 0011. Accordingly, the two binary zero states in the input code must be inverted so that the room key decoder 303 receives a binary signal of 1111 at its input. After the number of inversions is determined for each lock, the switches 318 are set, and only an incoming signal coded 0011 will pass through circuit 301 to provide a 1111 signal at the input of the room key decoder 303 and will not provide an enabling signal on lead 313 for improper lock selection data.

Gates 310 and 311 are connected by lines 320 and 321 respectively to the clock input 208. When clock pulses appear on line 320 and an enabling signal form the room key decoder 303 appears on line 313, gate 310 is enabled so that the clock pulses pass through the gate 310 to the room key shift register 237 to cause the serial access data on line 325 to be stored in the room key shift register 237.

All of the data on line 209 is presented to each room key shift register at each lock. Thus, buffered data is provided from the data input line 209 to the room key shift register 237 on line 325, and to the pass key shift register 236 on line 326. Accordingly, the only time that data is entered into the room key shift register 237 is when the gate 310 is enabled to provide enabling clock pulses on line 330 which commands the entry of data in register 237. Similarly, data present on line 326 is only entered in pass key shift register 236 when enabling clock pulses are provided thereto from gate 311 on line 328.

Circuit 301 also provides a predetermined code to the pass key decoder 305. As shown, the decoder 305 receives the binary input 1100, and all decoders in a predetermined number of locks may be set to receive that pass key code. Moreover, the pass key code may be changed periodically.

When all of the inputs to the pass key decoder 305 are high, an enabling signal is provided on line 314 to one input of the gate 311. When clock pulses appear on line 321, and an enabling signal is on line 314, the clock pulse will pass through to lead 328 ordering the data on line 326 to be stored in the pass key shift register 236. Thus, circuit means at the door lock unit provide the selection of the lock and of the register for storage of access data in registers at the lock.

In FIG. 13, a representative, commercially available, solenoid-actuated lock mechanism is designated generally at 401 and corresponds to the lock shown in the block diagram in FIG. 10. The door unit 36 includes a striker 39 for retaining the door 31 in a locked state until the solenoid 403 is actuated in response to an appropriate output from the 12 bit binary comparator 246, shown in FIG. 10.

When the door is in a locked condition, the armature member 405 is secured to a stop member 407 biased to the position shown in solid lines by torsion spring 409 having one leg secured to a support member 411. The support member 411 is generally L-shaped having one leg secured to a wall of the door unit 36. The other leg of the support member 411 provides a support so that the stop member 407 may rotate about pivot point 413.

When the solenoid 403 is actuated, the armature 405 is drawn to the position denoted in phantom outline causing the stop member 407 to pivot about point 413, thus disengaging the stop member 407 from the striker member 39. Thus, the striker member 39 is free to pivot about point 415 when an opening force is applied to the door 31.

An auxiliary solenoid 420 has its armature member 422 secured to the stop member 407 and provides means for unlocking the door in the event of power failure. As illustrated, the solenoid 420 draws a holding current for armature 422 when a source of power is available. If the power fails, the armature member is displaced axially to the position designated in phantom outline by the force exerted by spring 424, thus causing the stop member to disengage from the striker member 39 so that the door 31 may be opened as previously discussed. The mechanical linkage between the armature member 422 and the stop member 407 permits member 407 to pivot freely about point 413 although the auxiliary solenoid 420 is actuated.

FIG. 14 is a vertical cross-sectional side view of the card reader structure located at each door unit and shown partially in block form. A card 57 is illustrated in a slot 38 defined by a housing 501 and a cover plate 502. An exterior plate 504 provides an exterior panel which is secured to the wall 33 by a threaded bolt 505 and secures the frontal wall of the control unit to the wall 33.

A card reader assembly, designated generally at 510 is contained within the door unit 36 and comprises a plurality of phototransistors 511 in a circuit array in a printed circuit board 512. A plurality of bulbs 514 are located in openings 515 in a circuit array in circuit board 516. As in the case of the slug reader 116, the bulbs 514 in register with the locations for openings in the key card 57 and the phototransistors 511. The leads from the phototransistors 511 provide the output discussed in connection with the card reader 240 shown in FIG. 10. Access to the door control unit 36 is attained by removing the access panel 520, located in the room and which may be locked by member 522 in the conventional manner. After the access panel 520 is removed, the card reader assembly 510 may be replaced as a unit thus permitting ease of servicing. Voltage regulator circuit board 526 and memory and comparator board 524 and board 512 and 516 are secured by bolts 525 and spacers 527 to provide an integral structure. The circuit boards may be readily replaced on an individual basis.

Figure 15:
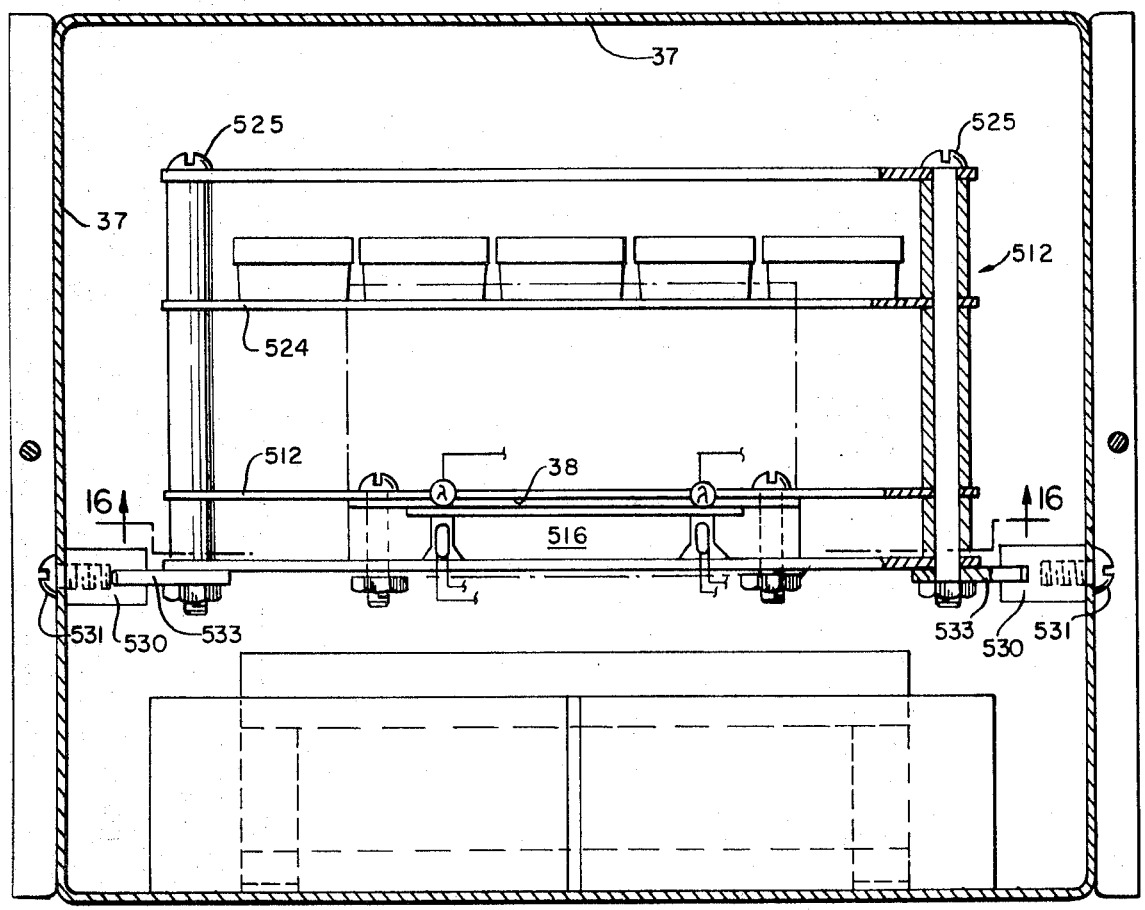
FIG. 15 is a vertical sectional front view of the card reader structure, taken along line 15—15 of FIG. 14.

FIG. 15 is a view taken along line 15—15 of FIG. 14 showing a frontal elevational view, partially in section, of the door control unit. A plurality of support members 530 are secured by bolts 531 to the housing 37 of the door control unit. Each of the support members defines a bifurcated tip which receives an extending support member 533 secured to the bolt 525. Thus, the card reader assembly may slid into and out of position quite readily for easy replacement or convenient servicing.

Figure 16:
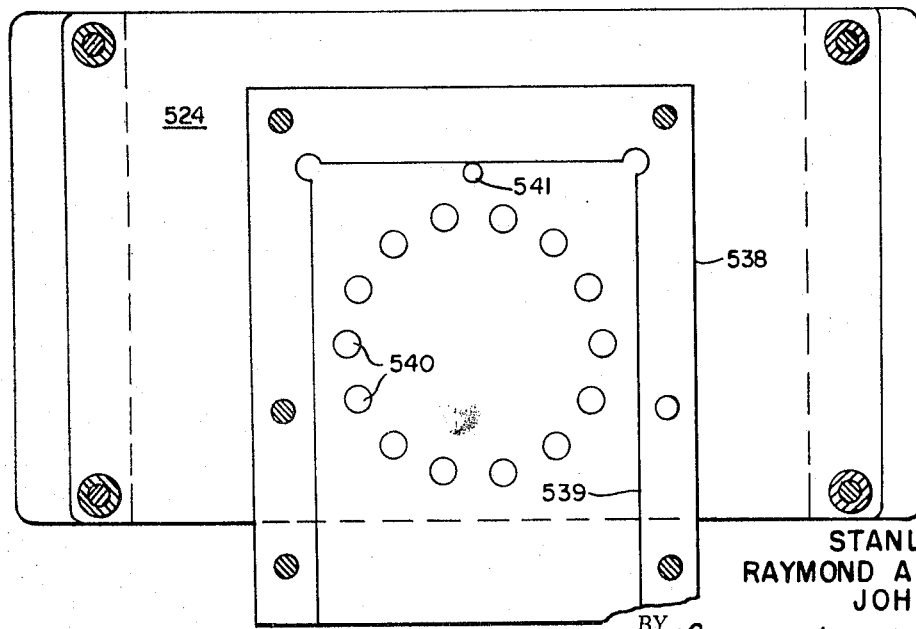
FIG. 16 is a horizontal view of the key card platen taken along line 16—16 of FIG. 15.

FIG. 16 is a view taken along line 16—16 in FIG. 15 which shows the card receiving platen 538 which includes a recess 539 defining a plurality of openings 540 in an array which will lie in register with the openings 60 of the key card when the card is completely inserted in the slot 38. FIG. 17 is a view taken along line 17—17 in FIG. 14 which shows the shutter assembly.

As best seen in FIG. 18, taken along line 18—18 in FIG. 17, a shutter 550 capable of a limited pivotal movement about a fixed pivot point is provided to insure the correct orientation of the key card 57 in the slot. When in the position shown in FIG. 18, the shutter 550 closes slot 38 to the card reader. A pivoted locking member 552 secures the shutter 550 in its closed position by the action of a biasing spring 554.

A pair of release pins 560 are positioned so that their tips 564 extend into the slot 38. When the card 57 is inserted into the slot 38, the pins 560 are raised, causing locking member 552 to pivot and thus freeing its restraint on the ability of the shutter 550 to pivot. When shutter 550 pivots, the card may be inserted into the card reader.

The shape of the shutter 550, seen in FIG. 19, and the tips 564 of the release pins are such that unauthorized cards or improperly oriented cards will not be admitted to the card reader.

Thus, the features of an electronic lock mechanism have been described in detail which permits the lock to be changed electronically from a remote location and achieves the objects and advantages which are apparent from the foregoing disclosure.

What is claimed is:
1. An electronic lock system comprising:
   a lock;
   means for releasing said lock upon command and in response to a random access code;
   electrical means for electronically and randomly generating said random access code which includes randomly generated access data at a location remote from said lock;
   storage means for storing said randomly generated access data; and
   coded means which contain a representation of said randomly generated access data for actuating said lock release means when the randomly generated access data of said coded means corresponds to the randomly generated access data in said storage means.

2. The electronic lock system as defined in claim 1 wherein said storage means includes a shift register and the access data is stored in said shift register.

3. The electronic lock system as defined in claim 2 further including data retrieval means for retrieving said access data from said coded means, and comparator means for comparing the retrieved data with the access data stored in said register.

4. The electronic lock system as defined in claim 3 further including means for transmitting said access data from a point remote from said register to said register.

5. The electronic lock system as defined in claim 4 wherein the access code generated by said random access-code-generating means includes both access data and clock signals.

6. The electronic lock system as defined in claim 5 wherein said register stores access data upon a command received from the clock signals.

7. The electronic lock system of claim 6 wherein the coded means comprises a binary-coded key card, said data retrieval means includes a card reader which provides a binary-coded output that corresponds to the binary code on said key card, and said comparator means is a binary comparator which compares the access data stored in said register with the binary-coded output from said data retrieval means, whereby when the comparison is satisfactory, a command is provided to said lock release means for releasing said lock.

8. The electronic lock system of claim 1 wherein said storage means includes a pass key register for storing pass key access data and a room key register for storing room key access data.

9. The electronic lock system as defined in claim 8 further including data retrieval means for retrieving access data from said coded means, said data retrieval means being further capable of providing a control signal indicating whether said access data is room key access data or pass key access data, switch means responsive to said control signal for selecting either said pass key register or said room key register, and comparator means for comparing the retrieved data with the access data stored in the selected register, whereby when the comparison is satisfactory, the lock will be actuated.

10. The electronic lock system as defined in claim 8 wherein said storage means further includes means for selecting which of said pass key register or said room key register is to store said access data, and means for storing the access data therein upon command from the clock signals generated by said access code generating means.

11. The electronic lock system as defined in claim 1 wherein the access-code-generating means includes means for electronically generating a random number, whereby said access data are randomly generated.

12. The electronic lock system as defined in claim 11 wherein said access-code-generating means includes means for generating a clock signal, means for storing said random number, and multiplexing means for providing an access data signal by reading out said store random number in serial form in accordance with said clock signals.

13. The electronic lock system as defined in claim 12 further including means for transmitting said access data signals and said clock signals to said storage means.

14. The electronic lock as defined in claim 12 further including means for encoding said coded means to correspond with said stored random number.

15. The electronic lock system as defined in claim 14 wherein said encoding means encodes said coded means in response to a command from said access-code-generating means.

16. The electronic lock system as defined in claim 15 further including means for counting the number of binary one states in said data signal to determine whether said number is between predetermined limits.

17. The electronic lock system as defined in claim 16 further including means responsive to said counting means to enable said encoding means when the number of binary one states is satisfactory and to enable the generation of another random number if the number of binary one states is unsatisfactory.

18. The electronic lock system as defined in claim 12 wherein said coded means is a key card, and said encoding means includes a punch press comprising means for perforating said key card at predetermined positions in a manner which corresponds to the stored random number.

19. The electronic lock as defined in claim 18 wherein said perforating means include a plurality of punches disposed in an array, a plurality of retractable members located so that when one of said members is in a first position, an opening will be punched into the card, and further including solenoid means for controlling the positioning of said member between said first position and said second position in response to the stored random number.

20. In a lock system of the type in which a lock which may be actuated by access data will be released by coded means containing corresponding access data, the combination of: electrical means for electronically and randomly generating said access data, means for rendering said lock operable by said randomly generated access data and means for encoding said coded means to contain said randomly generated access data.

21. The lock system as defined in claim 20 wherein said access data generating means and said encoding means are located at a central control location remote from said lock, and further including means for transmitting said access data to said lock, and means for storing said access data at said lock for comparison with the data encoded on said coded means, whereupon if the stored access data and the encoded access data correspond, the lock will be opened.

22. In a lock system which comprises a plurality of locks which may be actuated by access data, the combination of:
a central control station which includes electrical means for electronically and randomly generating access data for one of said locks, means for encoding coded means with said randomly generated access data,
a plurality of substations, each of which services a predetermined subgroup of locks, wherein each substation includes means for transmitting said randomly generated access data, and wherein
each of said locks includes means capable of storing said randomly generated access code so that each lock which stored said access code is capable of being actuated by said coded means.

23. The system as defined in capable 22 wherein said control station further includes means for providing lock selection data and substation selection data, which are capable of addressing said one of said locks, and means responsive to said substation selection data for selecting the substation which services said one of said locks.

24. The system as defined in claim 23 wherein said selected substation includes means for transmitting said lock selection data to said locks.

25. The system as defined in claim 23 wherein each of said locks serviced by said selected substation includes means responsive to said lock selection data for selecting said one of said locks to store the transmitted, randomly generated access code.

* * * * *

UNITED STATES PATENT OFFICE
CERTIFICATE OF CORRECTION

Patent No. 3,622,991            Dated November 23, 1971

Inventor(s) Stanley Lehrer, Raymond A. Robertson & John C. Holme

It is certified that error appears in the above-identified patent and that said Letters Patent are hereby corrected as shown below:

In the abstract: Line 13, delete "The memory circuit means for storing"; and line 14, delete "the newly generated access code".

Column 5, line 18, "47" should read -- 57 --.

Column 6, line 53, "a" should read -- an adjustable --; and line 54, "opening of the plates" should read -- depth of penetration into slots 93 --.

Column 7, line 18, -- output -- should be inserted after "binary-coded".

Column 9, line 75, "batter" should read -- battery --.

Column 12, line 3, "form" should read -- from --.

In the claims, claim 23, column 16, line 16, "capable" should read -- claim --.

Signed and sealed this 27th day of February 1973.

(SEAL)
Attest:

EDWARD M. FLETCHER, JR.
Attesting Officer

ROBERT GOTTSCHALK
Commissioner of Patents